US010533293B2

(12) United States Patent
Hoffmann et al.

(10) Patent No.: US 10,533,293 B2
(45) Date of Patent: Jan. 14, 2020

(54) INTERMEDIATE STORAGE VEHICLE, IN PARTICULAR CONSTRUCTION VEHICLE WITH AN INTERMEDIATE STORAGE TANK AND A MATERIAL DELIVERY CONVEYOR DEVICE, MILLING TRAIN AND CORRESPONDING METHOD

(71) Applicant: BOMAG GmbH, Boppard (DE)

(72) Inventors: Andre Hoffmann, Gondershausen (DE); Andreas Nacke, Dessighofen (DE); Marco Reuter, Emmelshausen (DE)

(73) Assignee: BOMAG GmbH, Boppard (DE)

( * ) Notice: Subject to any disclaimer, the term of this patent is extended or adjusted under 35 U.S.C. 154(b) by 216 days.

(21) Appl. No.: 15/458,343

(22) Filed: Mar. 14, 2017

(65) Prior Publication Data

US 2017/0275833 A1 Sep. 28, 2017

(30) Foreign Application Priority Data

Mar. 23, 2016 (DE) .......................... 10 2016 003 562

(51) Int. Cl.
*E01C 23/088* (2006.01)
*E01C 23/12* (2006.01)
*B60P 1/36* (2006.01)

(52) U.S. Cl.
CPC .............. *E01C 23/088* (2013.01); *B60P 1/36* (2013.01); *E01C 23/127* (2013.01)

(58) Field of Classification Search
CPC .... B65G 41/00; B65G 41/001; B65G 41/002; B65G 41/005; B65G 41/007; B65G 41/008; B60P 1/36; E01C 23/088; E01C 23/127

USPC ............ 198/311, 312, 315, 316.1, 317, 318; 414/503, 502, 505, 528
See application file for complete search history.

(56) References Cited

U.S. PATENT DOCUMENTS

| 5,026,205 | A | * | 6/1991 | Gorski | ................... E01C 19/025 241/101.73 |
| 5,026,206 | A | * | 6/1991 | O'Connor | .............. E01C 19/025 404/77 |
| 5,921,706 | A | * | 7/1999 | Manatt | ..................... B02C 21/02 404/72 |
| 5,927,617 | A | * | 7/1999 | Musso, Jr. | ................ B60P 1/36 239/657 |

(Continued)

FOREIGN PATENT DOCUMENTS

| CN | 102605707 A | 7/2012 |
| CN | 104058013 A | 9/2014 |

(Continued)

*Primary Examiner* — Janine M Kreck
*Assistant Examiner* — Michael A Goodwin
(74) *Attorney, Agent, or Firm* — Wood Herron & Evans LLP

(57) ABSTRACT

The present invention relates to an intermediate storage vehicle, particularly a construction vehicle, having an intermediate storage tank for receiving bulk material, particularly milled material, and a first material delivery conveyor device for delivery, unloading or transfer of the bulk material, the first material delivery conveyor device including a material delivery point, via which the bulk material can be thrown off. The present invention further relates to a milling train having such an intermediate storage vehicle and to a method for milling a road surface.

14 Claims, 9 Drawing Sheets

(56) References Cited

U.S. PATENT DOCUMENTS

| | | | | |
|---|---|---|---|---|
| 7,040,980 B1* | 5/2006 | Kestel | ................ | A01D 41/1217 |
| | | | | 414/345 |
| 8,662,972 B2* | 3/2014 | Behnke | ................ | A01B 69/008 |
| | | | | 414/505 |
| 2006/0045621 A1* | 3/2006 | Potts | ..................... | E01C 23/121 |
| | | | | 404/91 |
| 2007/0122235 A1* | 5/2007 | Kasahara | ............... | E01C 23/065 |
| | | | | 404/75 |
| 2010/0290878 A1* | 11/2010 | Ricketts | ............... | A01D 90/105 |
| | | | | 414/505 |
| 2011/0123268 A1 | 5/2011 | Berning et al. | | |
| 2012/0067692 A1* | 3/2012 | Forster | ................. | E01C 23/088 |
| | | | | 198/320 |
| 2013/0076101 A1 | 3/2013 | Simon | | |
| 2013/0080000 A1 | 3/2013 | Von der Lippe et al. | | |
| 2014/0286706 A1 | 9/2014 | Klockner | | |
| 2016/0053445 A1 | 2/2016 | Berning et al. | | |
| 2016/0183470 A1* | 6/2016 | Missotten | .......... | A01D 41/1217 |
| | | | | 414/526 |

FOREIGN PATENT DOCUMENTS

| | | | |
|---|---|---|---|
| CN | 104153282 A | | 11/2014 |
| DE | 102009041842 A1 | | 9/2011 |
| DE | 102011114183 A1 | | 3/2013 |
| DE | 102011114185 A1 | | 3/2013 |
| DE | 102013004995 A1 | | 9/2014 |

* cited by examiner

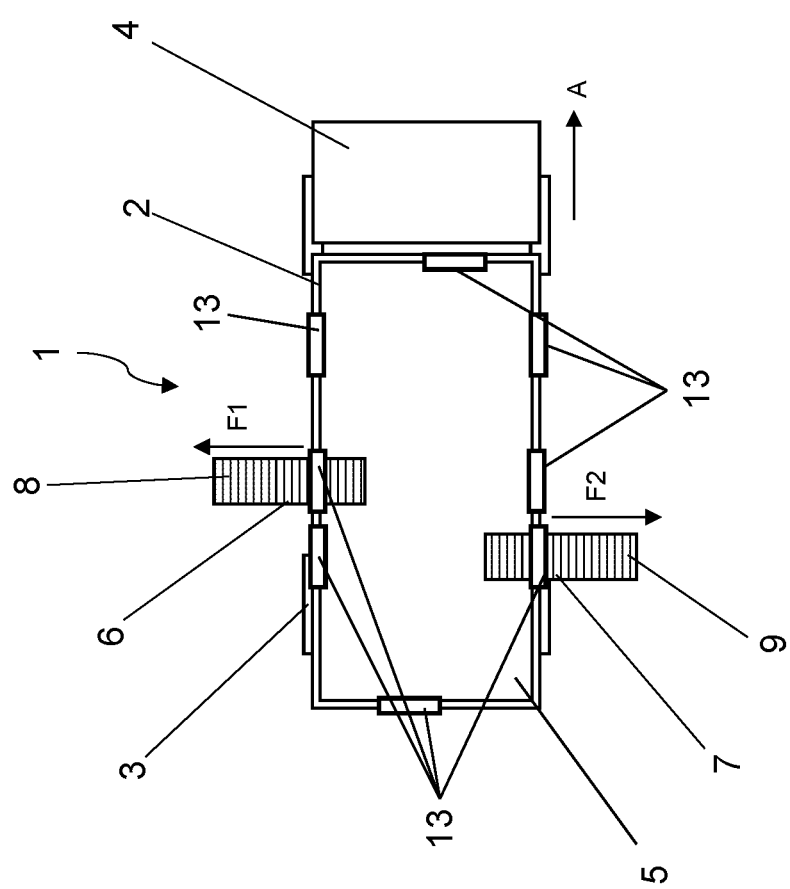

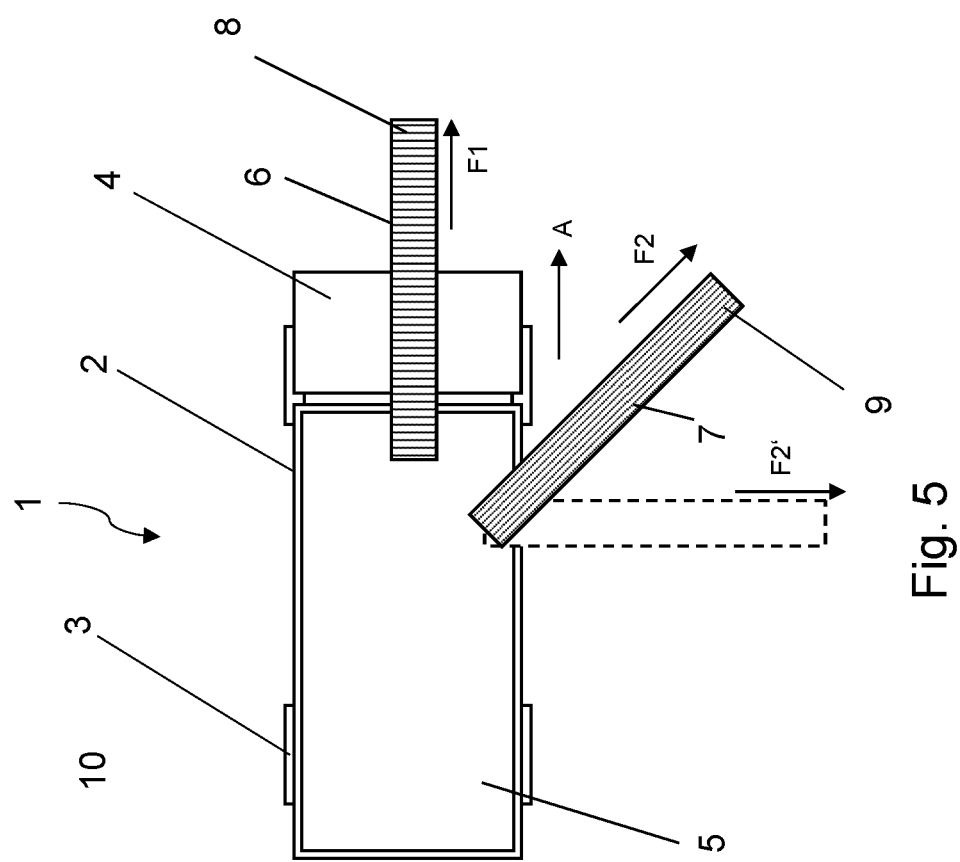

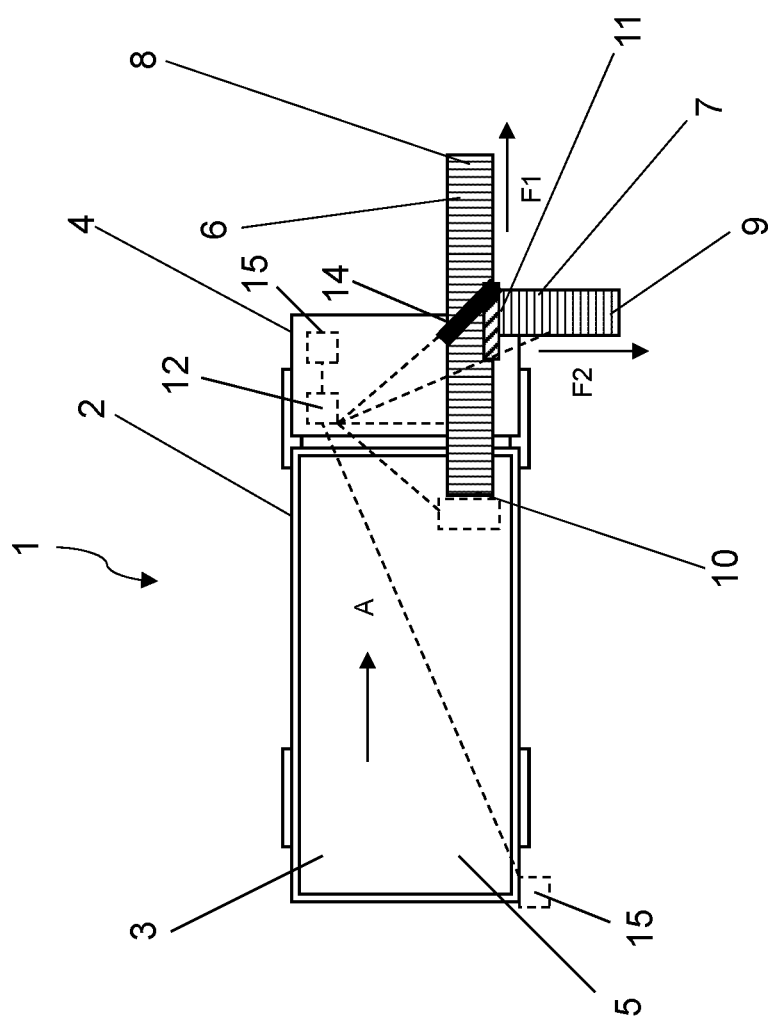

INTERMEDIATE STORAGE VEHICLE, IN PARTICULAR CONSTRUCTION VEHICLE WITH AN INTERMEDIATE STORAGE TANK AND A MATERIAL DELIVERY CONVEYOR DEVICE, MILLING TRAIN AND CORRESPONDING METHOD

CROSS-REFERENCE TO RELATED APPLICATION

The present application claims priority under 35 U.S.C. § 119 of German Patent Application No. 10 2016 003 562.5, filed Mar. 23, 2016, the disclosure of which is hereby incorporated herein by reference in its entirety.

FIELD OF THE INVENTION

The present invention relates to an intermediate storage vehicle, particularly a construction vehicle, with an intermediate storage tank for receiving bulk material, particularly milled material.

BACKGROUND OF THE INVENTION

When performing construction works, particularly road construction works, for example, the removal and/or renewal of road surfaces, intermediate storage vehicles are sometimes used, which, depending on the exact operating conditions, collect or intermediately store various types of bulk material, such as milled material, and, for the purpose of hauling it away or processing it, deliver it via a material delivery conveyor device, for example, a belt conveyor, for example, to a provided transport or construction vehicle, for example, a road paver. For reasons of efficiency, such material delivery frequently occurs simultaneously with the regular construction process. Thus, the core task of such intermediate storage vehicles lies in the transitional intermediate storage of bulk material in an ongoing work process. Moreover, it is known that the work machines themselves comprise storage means for bulk material, however the storage capacity of such intermediate storage means is naturally comparatively small. This is known, for example, with road pavers with their commonly used paving material hoppers.

A configuration of an intermediate storage vehicle known in the prior art relates to an intermediate storage vehicle having an intermediate storage tank or intermediate storage means for receiving bulk material and a material delivery conveyor device, using which the bulk material can be conveyed and dropped from the intermediate storage tank to a material delivery location.

Particularly, when using road-milling machines for removing road surfaces, in view of the continually increasing performance of these machines, there is a need for improving the handling of the milled material incurred during the milling process to enable the milled material to be efficiently hauled away. Currently, hauling the milled material away frequently constitutes a bottleneck for the entire process, particularly with increasing milling depths. Such a ground milling machine is disclosed, for example, in DE 10 2009 041 842 A1 of the same applicant. During operation, the road milling machine moves, for example, in a working direction along a roadway, while a rotating milling drum of the road milling machine equipped with milling chisels mills the road surface. The bulk material-like milled material incurred in the process is then transferred via a material delivery conveyor device, typically a belt conveyor, to an accompanying transport vehicle. After a short period, the transport vehicle reaches its maximum carrying capacity and must be replaced with another transport vehicle. During this replacement of the transport vehicles, the operation of the road milling machine must be briefly halted because the milled material produced cannot be transferred to a transport container during the process of replacing the transport vehicles.

The object of the present invention is to improve and design more efficiently the handling of bulk material in a harvesting or work process, particularly a milling process, to enable a smoother and more efficient overall work process.

SUMMARY OF THE INVENTION

Specifically, the object is achieved through an intermediate storage vehicle, particularly a construction vehicle. A generic intermediate storage vehicle comprises an intermediate storage tank for receiving bulk material, particularly milled material. Furthermore, a first material delivery conveyor device for delivering, discharging or transferring the bulk material is provided, wherein said first material delivery conveyor device having a material delivery point, from where the bulk material can be dropped. The material delivery point therefore designates the delivery end of the material delivery conveyor device or that point of the material delivery conveyor device at which the milled material leaves the conveyor device. The intermediate storage tank involves a receiving device or a receiving space, in which bulk material can be collected. This may be, for example, a collection container, particularly having an open top, for example, a trough. The storage capacity of the intermediate storage tank is ideally dimensioned such that its maximum possible load at least corresponds to the maximum permissible load volume and/or the maximum permissible load weight of a common bulk material vehicle, for example, a transport truck having a trough for bulk material. With the first material delivery conveyor device, it is possible to unload bulk material out of the intermediate storage tank from an intermediate storage vehicle and, in particular, to transfer it to another vehicle. The material delivery conveyor device may be designed in such a way that it itself conveys the bulk material out of the intermediate storage tank and delivers it to the material delivery point. Alternatively, it is also possible that a separate conveyor is provided inside the intermediate storage tank, by means of which the bulk material is delivered from the intermediate storage tank to the material delivery conveyor device. This may be, for example, a scraper floor, a suction device, a screw conveyor, or a conveyor channel located in the floor, etc. If, for example, belt conveyors or similar conveyor devices are used, the material delivery point then describes the dropping point, at which the bulk material is dropped by the conveyor device, for example, by diverting the conveyor belt.

What is now significant for the present invention is that, in addition to the first material delivery conveyor device, according to the present invention, at least one second material delivery conveyor device is provided on the intermediate storage vehicle. According to one embodiment of the present invention, this second material delivery conveyor device likewise comprises a material delivery point, via which the bulk material can be dropped. Thus, two individual material delivery conveyor devices are provided on the intermediate storage vehicle, via which the bulk material collected in the intermediate storage tank can be dropped from the intermediate storage vehicle, particularly onto transport vehicles. The two material delivery conveyor devices are arranged in such a way that the first and second material delivery conveyor devices enable a delivery, discharge or transfer on two different sides of the intermediate storage vehicle. Thus, the material delivery conveyor devices are not arranged next to each other and parallel to each other in such a way that they respectively convey in the same direction when viewed from the intermediate storage tank. It is important that the intermediate storage vehicle can therefore be approached by respective transport vehicles on different sides to enable transfer of bulk material. As a result, for example, traffic tie-up situations or time consuming transport vehicle replacements at a single transfer point can be avoided. For example, while a transport vehicle is being loaded via the first material delivery conveyor device, it is already simultaneously possible for another transport vehicle to be positioned relative to the second material delivery conveyor device, so that ideally even a largely continuous, interruption-free overall transfer process onto alternating transport vehicles is possible. At the same time, the presence of the intermediate storage tank allows for periods of time, during which none of the two material delivery conveyor devices is in bulk material transfer operation, for example, because no suitable transport vehicle is available, to be compensated. The respective work process, for example, milling a road surface, can then still be continued because the intermediate storage tank is designed for the transitional reception of a specific allotment of bulk material. Overall, the intermediate storage vehicle therefore enables the work process of the ground milling machine to be primarily continuous and interruption-free, for example, when milling a road surface, because the previously required replacement times for transport vehicles no longer exist. Instead, the milling machine can continue its work process consistently and without interruption. Replacement times for transport vehicles are compensated by the intermediate storage vehicle according to the present invention.

A control device is preferably provided on the intermediate storage vehicle, which controls the operation of the first and/or second material delivery conveyor devices. The control unit has the primary function of affecting the transfer operation of the first and/or second material delivery conveyor devices, be it through turning the material delivery conveyor devices on and off, through changing/adapting positions of the drop points of the material delivery conveyor devices, etc. The control unit is preferably designed in such a way that it independently controls the first and second material delivery conveyor devices. The control unit can therefore activate, for example, the first material delivery conveyor device and simultaneously shut off the second material delivery conveyor device and/or change its position.

Ideally, the control unit further comprises a control device, particularly on an operator platform and/or an external control platform of the intermediate storage vehicle, from which the first and second material delivery conveyor devices can be controlled. It is also possible to couple the functionality of the control unit to other automation systems. These may be, for example, position detection systems for transport vehicles, distance sensors measuring distances relative to work and/or transport vehicles, for example, particularly to road milling machines and/or transport trucks, filling level detection systems, which enable a monitoring and appropriate transfer control depending on the filling level of transport vehicles, etc.

The first material delivery conveyor device is preferably arranged on the intermediate storage vehicle in such a way that it enables delivery, discharge or transfer of the bulk material in the forward direction of the intermediate storage vehicle to the front, rear, right or left. At the same time, the second material delivery conveyor device is arranged on the intermediate storage vehicle such that it enables delivery, discharge or transfer of the bulk material in the forward direction of the intermediate storage vehicle to the front, rear, right or left, wherein, according to one embodiment of the present invention, the sides to which bulk material is delivered, discharged or transferred by the first and second material delivery conveyor devices differ from each other. A particularly suitable relative arrangement of the first and second material delivery conveyor devices relates, for example, to an arrangement of the first material delivery conveyor device in such a manner that it unloads in the forward direction of the intermediate storage vehicle. The second material delivery conveyor device is then preferably arranged in such a manner on the intermediate storage vehicle that it enables a respective loading to the right or left side when viewed in the forward direction. An alternative and likewise preferred arrangement is the arrangement of the first and second material delivery conveyor devices to the right and to the left when viewed in the forward direction. Respective diagonal positions of the conveyor device in relation to the forward direction are also comprised in the present invention. This means that an additional, preferred alternative arrangement consists in that, when viewed in the forward direction of the intermediate storage vehicle, the first material delivery conveyor device is oriented diagonally to the front right side and the second material delivery conveyor device is oriented diagonally to the front left side. Ultimately, all constellations of the two material delivery conveyor devices enabling simultaneous transfer of the bulk material to two different transport vehicles by the first and second material delivery conveyor devices loading to different sides of the intermediate storage vehicle are comprised in the present invention.

The first material delivery conveyor device and the second material delivery conveyor device may principally be designed completely differently. Advantageously, however, both material delivery conveyor devices are designed at least essentially in the same way. In particular, this includes that the first material delivery conveyor device and the second material delivery conveyor device use the same conveyor technology, i.e., for example, both are designed as belt conveyors. However, the two material delivery conveyor devices certainly may differ from each other with respect to their dimensions and technical details, although they are preferably designed structurally identical in these respects as well. In principle, the utilized conveyor technology is variable and solely depends on the respective optimum for the material to be conveyed. However, a design as a continuous conveyor is preferred due to the properties of the material intended to be conveyed in the preferred applications of the intermediate storage vehicle according to one embodiment of the present invention. Thus, both the first and the second material delivery conveyor device can be designed, for example, as a pipeline system or, preferably, as a belt conveyor assembly. Accordingly, according to one embodiment of the present invention, the first material delivery conveyor device and the second material delivery conveyor device are respectively designed as belt conveyors. Moreover, when using essentially identical material delivery conveyor devices, spare part storage can be handled more efficiently and the operation of the intermediate storage vehicle is also simplified. The intermediate storage vehicle preferably comprises precisely two material delivery conveyor devices.

The benefits of the intermediate storage vehicle according to the present invention emerge particularly clearly if the first material delivery conveyor device and the second material delivery conveyor device are designed for unloading one and the same intermediate storage tank. It is then possible for the intermediate storage vehicle to comprise only a single intermediate storage tank, from which bulk material can be delivered to both the first and the second material delivery conveyor device for loading purposes.

The specific configuration of the first material delivery conveyor device and the second material delivery conveyor device on the intermediate storage vehicle may vary. In principle, static material delivery conveyor devices that are unchangeable in their relative position are initially conceivable and also comprised by the present invention. However, to be able to react particularly to various usage conditions and/or transport vehicles, for example, with respect to the necessary loading height, it has been found to be preferable if the first material delivery conveyor device and/or the second material delivery conveyor device are mounted such that they can be rotated about a vertical axis. With this configuration, it is particularly possible to achieve fine-adjustment of the respective material delivery point. Additionally, or alternatively, the first and/or second material delivery conveyor devices may be designed to be height adjustable, particularly at least with regard to their respective material delivery point. As a result, the position of the material delivery point can then be adapted to the respective circumstances in the vertical direction. This can occur, for example, by swiveling the material delivery conveyor device about a horizontal axis.

The variability of the intermediate storage vehicle according to the present invention may further be additionally increased by the first and/or second material delivery conveyor device being detachable and the intermediate storage vehicle comprising at least three bearing points for the first and/or second material delivery conveyor devices, particularly on different sides of the intermediate storage vehicle, on which the first and/or second material delivery conveyor devices can be mounted and operated. This embodiment also comprises variants in which one of the two material delivery conveyor devices is not designed for removal and the respectively other material delivery conveyor device can be arranged on one of at least two bearing points on the intermediate storage vehicle as desired. This enables adapting of the relative positioning of the first and/or second material delivery conveyor devices on the intermediate storage vehicle to the respective operational situation. This may be essential, for example, if certain soil load capacities or similar are no longer available on one side of the intermediate storage vehicle, as may frequently occur, for example, during milling operations. Maximum variability is achieved if at least one or even more bearing points is/are provided for one of the material delivery conveyor devices on all four sides of the intermediate storage vehicle.

The present invention comprises embodiments in which the loading of the bulk material from the intermediate storage tank onto the first and second material delivery conveyor devices occurs separately. Accordingly, for example, the first and/or second material delivery conveyor devices may be designed in such a way that the bulk material is transferred directly from the intermediate storage tank onto the first and/or second material delivery conveyor devices, for example, through falling. However, it is preferred if the intermediate storage vehicle comprises a material switch, which is ideally arranged, for example, in the intermediate storage tank and supplies the bulk material to the first and/or second material delivery conveyor devices depending on the operational position. The function of the material switch therefore lies in controlling the material flow of the bulk material to the first and second material delivery conveyor devices. Specifically, the material switch may be, for example, a controllable flap or a similar device enabling control of the bulk material flow. By using such a material switch, the design of the overall system can be simplified in that the control unit can control the supply of the bulk material to the first and/or second material delivery conveyor devices at a central point by controlling the material switch.

The transfer of the bulk material from the intermediate storage tank to the first and second material delivery conveyor devices can be simplified if a central material feeding device is provided, which-controlled, in particular, via the material switch—can supply the bulk material from the intermediate storage tank to the first and second material delivery conveyor devices. The primary function of the central material feeding device is therefore to convey the bulk material out of the intermediate storage tank and towards the first and second material delivery conveyor devices. This central material feeding device may therefore be, for example, a floor scraper or the like.

In principle, the two material delivery conveyor devices may be set up completely independently. However, there is also the option of combining the two material delivery conveyor devices in such a way that the second material delivery conveyor device can be supplied via the first material delivery conveyor device. A material switch can be used here as well, with which a material flow can be directed through the material delivery conveyor device to one of two delivery areas, which then are the delivery area of the first material delivery conveyor device and the delivery area of the second material delivery conveyor device. The position of the material switch thus determines whether the material should be directed to the delivery area of the first material delivery conveyor device or whether the material should be directed to the delivery area of the second material delivery conveyor device.

While it is generally possible that both material delivery conveyor devices can only be operated together, it is advantageous if the first material delivery conveyor device and the second material delivery conveyor device can be independently operated and respectively controlled by the control unit. In other words, each of the material delivery conveyor devices can be operated, while the respectively other material delivery conveyor device is idle. This may be achieved, for example, by each of the material delivery conveyor devices having its own drive unit. It is, however, also possible that both material delivery conveyor devices are driven by the same drive power source, though independently capable of being uncoupled from this drive power source via suitable coupling devices.

Furthermore, the control system may be designed such that it jointly controls both material delivery conveyor devices, i.e., for example, it sends the same control commands to both material delivery conveyor devices. However, the system is preferably designed in such a way that it can control the two material delivery conveyor devices independently, i.e., for example, it can control the first material delivery conveyor device such that it is idle, while controlling the second material delivery conveyor device such that it actually conveys material. In this connection, it is also possible that both conveyor devices convey but differ with respect to their conveying speed. Thus, the control system is also preferably designed in such a way that it is capable of controlling the two material delivery conveyor devices such that they have different conveying speeds. In other words, the conveying speed of the first material delivery conveyor device and the conveying speed of the second material delivery conveyor device can preferably be independently controlled and/or regulated.

The benefits of the present invention emerge particularly clearly if the intermediate storage vehicle according to the present invention as described above is used in a milling train. In the present case, a milling train refers to a work train which is designed for milling and removing ground material, for example, in the course of road milling operations. The milling train comprises at least one milling vehicle, for example, a road milling machine of a known type. Moreover, the milling train includes the intermediate storage vehicle according to the present invention. Further, the functions of the intermediate storage vehicle may also be integrated in the aforesaid milling vehicle. The intermediate storage vehicle is loaded with milled material by the milling vehicle. The milled material is removed by appropriate transport vehicles, for example, dump trucks. They are loaded by the intermediate storage vehicle via the first and/or second material delivery conveyor devices. In contrast to the milling process, which ideally is a largely continuous work process, the process of loading the milled material onto the individual transport vehicles occurs in intervals, more specifically until reaching the maximum load of the respective transport vehicle. The intermediate storage vehicle with the aforementioned functionalities now makes it possible that the milling process can be continued over long milling routes consistently and without interruption. The material is loaded in intervals, however without interrupting or even stopping the continuation of the milling process.

In an embodiment of the present invention, the milling train therefore also comprises at least one assistance system, which monitors and ideally even controls or regulates the relative positioning of the intermediate storage vehicle to the milling vehicle. This may be a known distance control, as is already described, for example, in DE 102011114185, which is incorporated herein by reference. Additionally, or alternatively, a loading control system is also possible, which at least partially automates the process of transferring the milled material from the intermediate storage vehicle to the respective transport vehicle, as described, for example, in DE 102011114183, which is incorporated herein by reference. This may consist in a system for directing the transport vehicle driver to the respectively desired loading position relative to the intermediate storage vehicle, for example, in the form of lights or comparable optical/acoustic display and signaling systems. It is also possible to have, for example, a detection system of the transport container of the respective transport vehicle, which relates this position to the current position of the material delivery point of the respective material delivery conveyor device. Functions of the control unit, for example, a swivel or height adjustment function of the respective material delivery conveyor device, or even the conveyor speed, may also occur depending on these additional assistance systems. As a result, it is possible to at least partially automate the operation of the milling train, particularly with respect to the interaction of the road milling machine with the intermediate storage vehicle and the interaction of the intermediate storage vehicle with one or more transport vehicles.

An additional aspect of the present invention relates to a method for milling a road surface, particularly using a milling train as described above. This relates, in particular, to the use of an intermediate storage vehicle according to the present invention in such a milling train. The significant steps of the method according to the present invention consist first in the milling of a surface at a desired milling depth using a ground milling machine, particularly a road milling machine, for example, of a known design. Furthermore, the method according to the present invention relates to the gathering of the milled material, particularly by the road milling machine, into the intermediate storage tank of the intermediate storage vehicle. In particular, this step may occur continuously throughout the entire work process of the road milling machine. The essential step of the method according to the present invention is the next step, in which the milled material located in the intermediate storage tank is transferred to a first and/or a second transport vehicle via a first material delivery conveyor device and/or a second material delivery conveyor device, which step occurs independently of the milling process. Thus, it is important that the method according to the present invention also comprises a step of transferring the milled material from the intermediate storage vehicle to the respective transport vehicle, such transfer process being possible on different sides of the intermediate storage vehicle depending as desired, for example, in alternation, via the first material delivery conveyor device and the second material delivery conveyor device, as described above. Thus, while milled material is being loaded onto a first transport vehicle via the first material delivery conveyor device, the second material delivery conveyor device can be simultaneously approached by a second transport vehicle at another point of the intermediate storage vehicle. If the process of loading the first transport vehicle is completed, the loading process can occur without delay via the second material delivery conveyor device to the second transport vehicle. All of this occurs particularly preferably while the milling train is in operation and is thus advancing. Even if a second transport vehicle is not yet in position at the time of completion of the transfer of the milled material into the first transport vehicle, the milling process can still be continued because incurred quantities of milled material can be transitionally stored in the intermediate storage tank of the intermediate storage vehicle. Thus, periods during which no transport vehicle is available for transferring the milled material thereto can be easily bridged without a slowdown or even an interruption of the actual work process, i.e., the milling process, being necessary.

The method according to the present invention even preferably allows that the milled material be simultaneously transferred via the first and second material delivery conveyor devices to a first and a second transport vehicle. As a result, for example, the intermediate storage tank of the intermediate storage vehicle can be particularly quickly unloaded.

BRIEF DESCRIPTION OF THE DRAWINGS

The present invention will be described in further detail below with reference to the exemplary embodiments shown in the figures. In the schematic figures:

FIG. 4 is a top view of an intermediate storage vehicle according to the present invention in a fourth embodiment;

FIG. 5 is a top view of an intermediate storage vehicle according to the present invention in a fifth embodiment;

FIG. 6 is a top view of an intermediate storage vehicle according to the present invention in a sixth embodiment;

Like components are designated in the figures by like reference signs, although reference signs designating recurring components may be omitted in some of the figures.

DETAILED DESCRIPTION OF THE INVENTION

Figure 7:
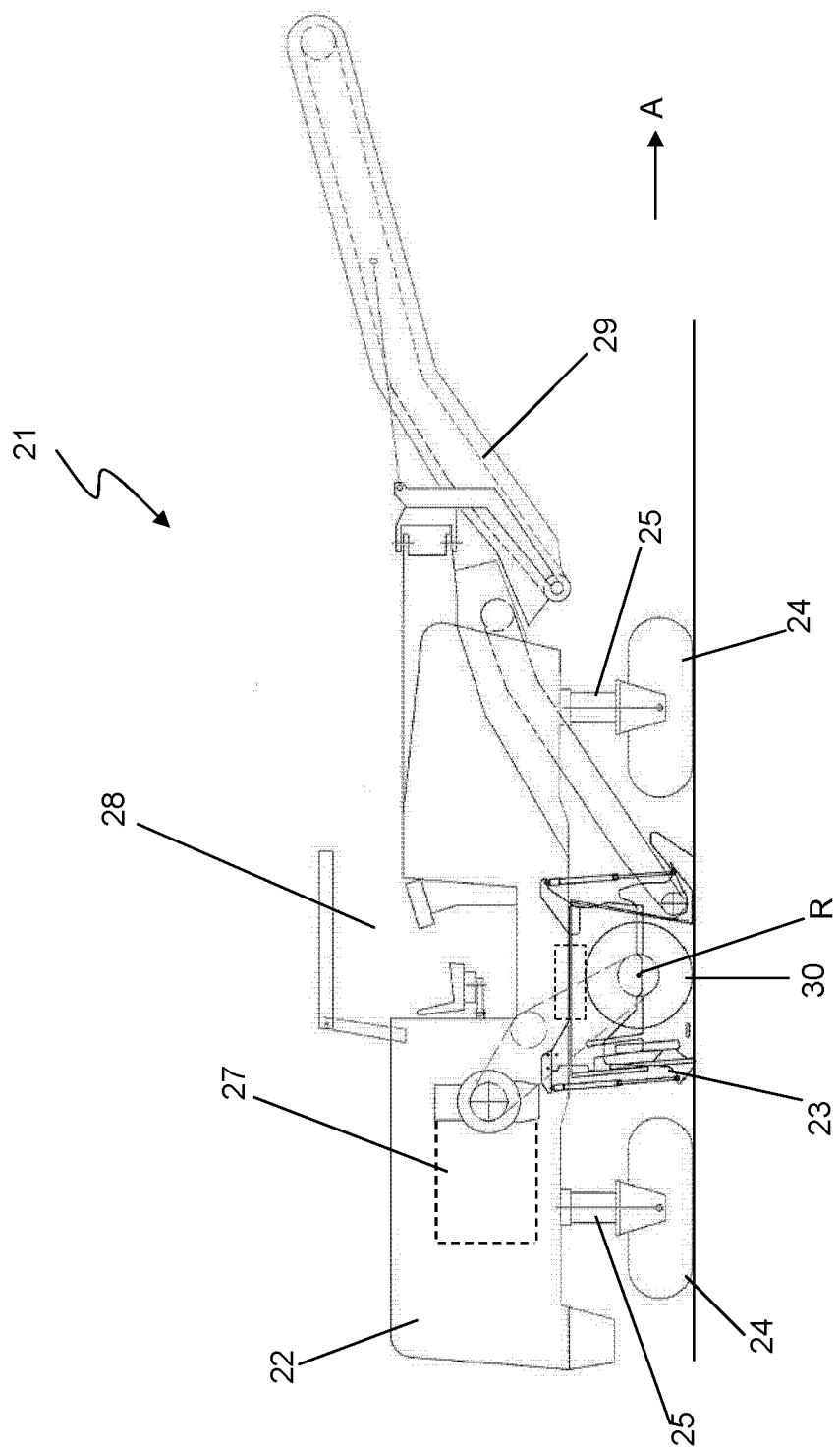
FIG. 7 is a side view of a road milling machine of a known design.
Figure 8:
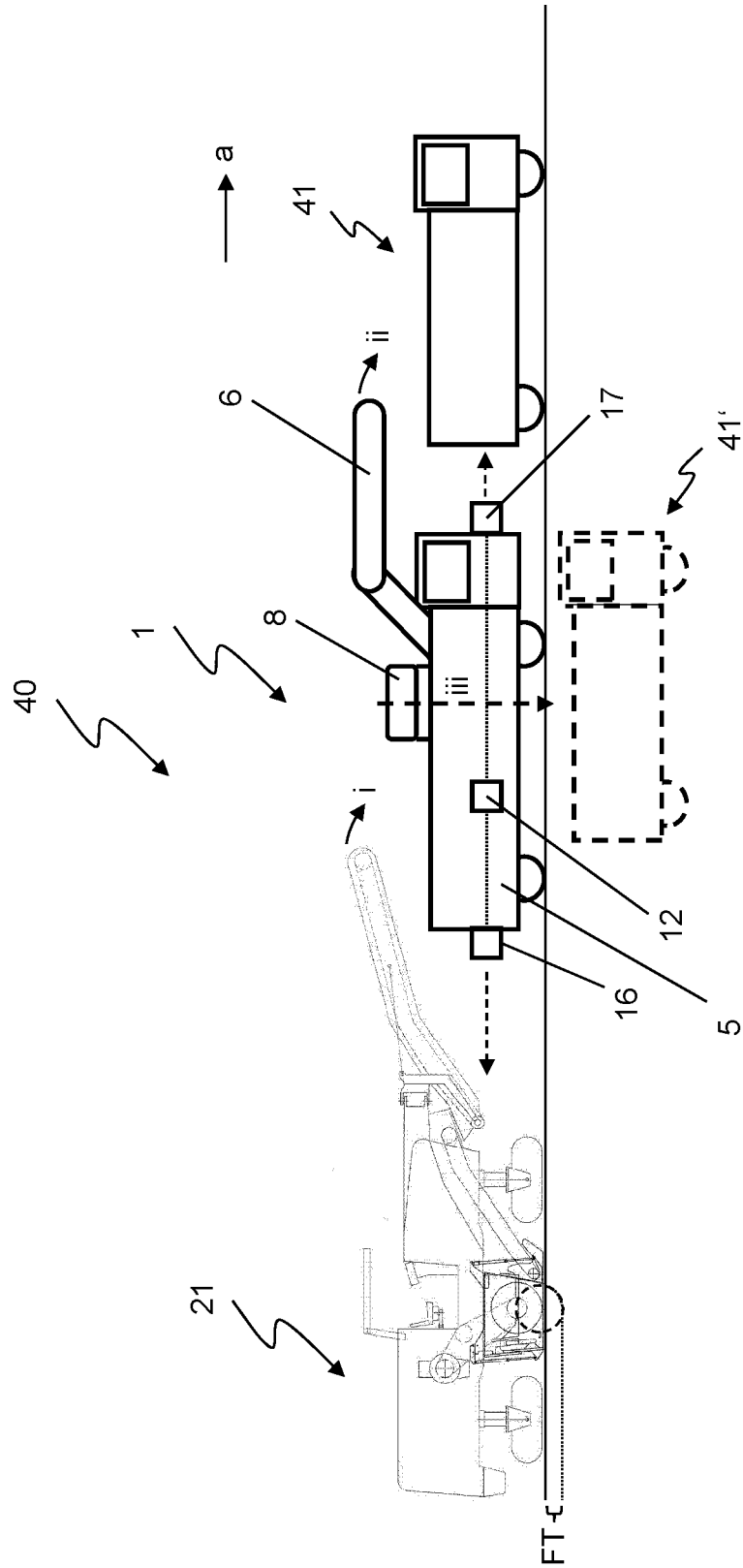
FIG. 8 is a side view of a milling train comprising a transport vehicle and an intermediate storage vehicle according to the present invention.
Figure 9:
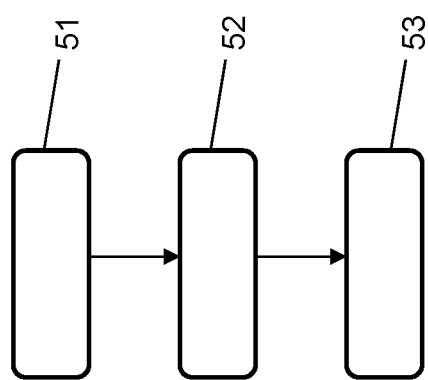
FIG. 9 is a flowchart of the work method according to the present invention.

FIGS. 1 to 6 illustrate various exemplary embodiments of an intermediate storage vehicle according to the present invention, FIG. 7 shows the elements of a road milling machine, the interaction of which with an intermediate storage vehicle is illustrated in further detail with the milling train shown in FIG. 8. Finally, FIG. 9 provides an overview of an implementation of a method according to the present invention.

The elements of an intermediate storage vehicle 1 according to one embodiment of the present invention are a machine frame 2, a travel unit 3 (including wheels and/or crawler tracks), an operator platform 4, an intermediate storage tank 5, a first material delivery conveyor device 6, and a second material delivery conveyor device 7. In this connection, the intermediate storage vehicle 1 is generally designed for receiving or being loaded with bulk materials, the intermediate storage tank 5 being designed for receiving the respective bulk material. Thus, the intermediate storage tank 5 represents a bulk material intermediate storage device, in which bulk material is accumulated at least transitionally, for example, through a more or less continuous loading process occurring, for example, via the conveyor belt of a road milling machine.

In the simplest case, the intermediate storage tank 5 may be a storage trough, which provides adequate storage space for the bulk material. The intermediate storage vehicle 1, which will be described in further detail below, is particularly suitable for use in a milling train as described in closer detail in FIG. 8. The same applies for the other alternative exemplary embodiments of the intermediate storage vehicle 1.

The intermediate storage vehicle 1 is designed to be self-propelled and therefore has its own drive engine (not depicted). The forward direction of the intermediate storage vehicle 1 is specified with the arrow A. The intermediate storage vehicle 1 is operated from the operator platform 4, although input devices that are arranged laterally or are controllable from the outside may, additionally, or alternatively, be included so that an operator may also stand next to or walk along with the intermediate storage vehicle 1 during loading operations.

Figure 1:
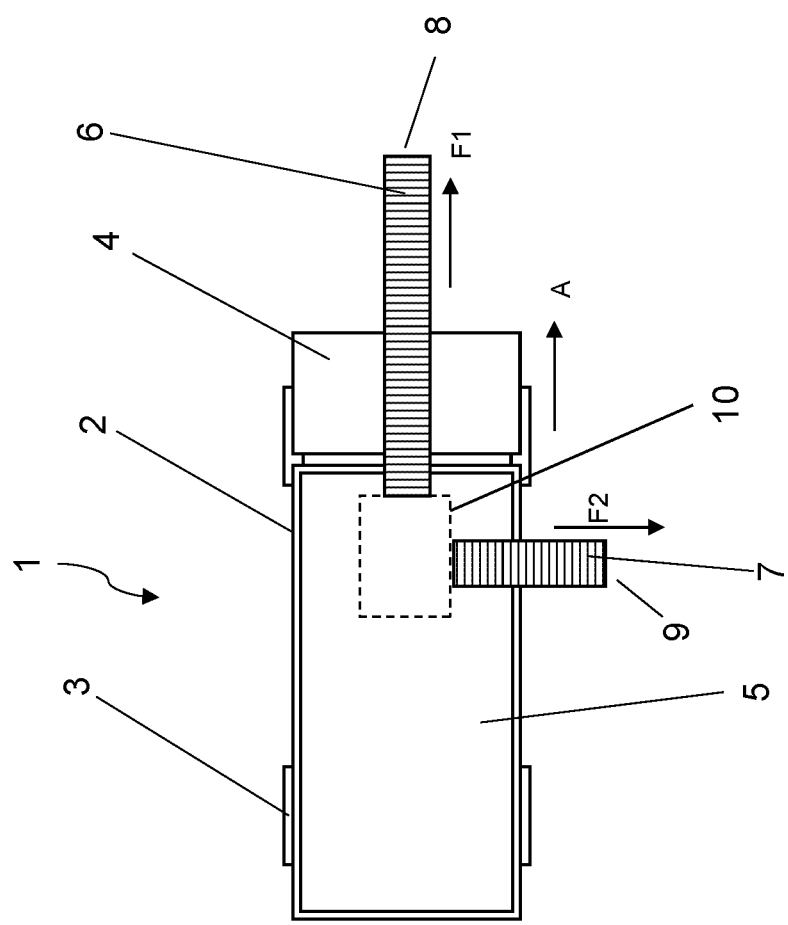
FIG. 1 is a top view of an intermediate storage vehicle according to the present invention in a first embodiment.

The intermediate storage tank 5 is usually loaded by dropping bulk material, in the present example milled material, from above into the container of the intermediate storage tank 5. It is essential here that the intermediate storage tank 5 may be alternatively unloaded via the first material delivery conveyor device 6 (in conveying direction F1) or the second material delivery conveyor device 7 (in conveying direction F2) on different sides of the intermediate storage vehicle (in relation to a horizontal plane). For this purpose, the first material delivery conveyor device 6 and the second material delivery conveyor device 7 are centrally operated from the operator platform. A control unit, through which the first material delivery conveyor device 6 and the second material delivery conveyor device 7 can be controlled, and which is not depicted in further detail in FIG. 1, is provided for this purpose. The intermediate storage vehicle 1 therefore enables the intermediate storage tank 5 to receive milled material while advancing during operation and-likewise particularly while advancing during operation-the milled material located in the intermediate storage tank 5 to be transferred from the intermediate storage tank 5 via either the first material delivery conveyor device 6 and/or the second material delivery conveyor device 7 on different sides of the intermediate storage vehicle 1, for example, onto one or more suitable transport vehicles.

In this connection, the exemplary embodiment according to FIG. 1 illustrates that the conveying directions F1 and F2 of the first material delivery conveyor device 6 and the second material delivery conveyor device 7 differ from one another. In this specific exemplary embodiment, the conveyors are arranged at a right angle relative to one another in the horizontal plane. With the first material delivery conveyor device 6, it is possible to load the bulk material in the forward direction A, and with the second material delivery conveyor 7, it is possible to load to the side of the intermediate storage vehicle 1 (to the right side in this specific exemplary embodiment). Thus, transport vehicles in two different relative positions to the intermediate storage vehicle 1 can be loaded from the intermediate storage tank 5. As a result, while a transport vehicle is still being loaded via one of the two material delivery conveyor devices, another transport vehicle can already assume a suitable transfer position at the other material delivery conveyor device.

Furthermore, a central material feeding device 10 is arranged in the area of intermediate storage tank 5. The function of the central material feeding device 10 consists in feeding the bulk material located in the intermediate storage tank 5 to the first material delivery conveyor device 6 and, optionally, to the second material delivery conveyor device 7. Specifically, the central material feeding device 10 may be, for example, a scraper belt or a fall sluice, etc., arranged on the floor of the intermediate storage tank 5. What is important is the functionality of the central material feeding device as a means for feeding the bulk material from the intermediate storage tank 5 to the material delivery conveyor devices 6 and 7. The central material feeding device 10 is preferably likewise controlled by a control unit, through which a material flow is controlled, particularly automatically, by controlling the first material delivery conveyor device and/or the second material delivery conveyor device 7.

Figure 2:
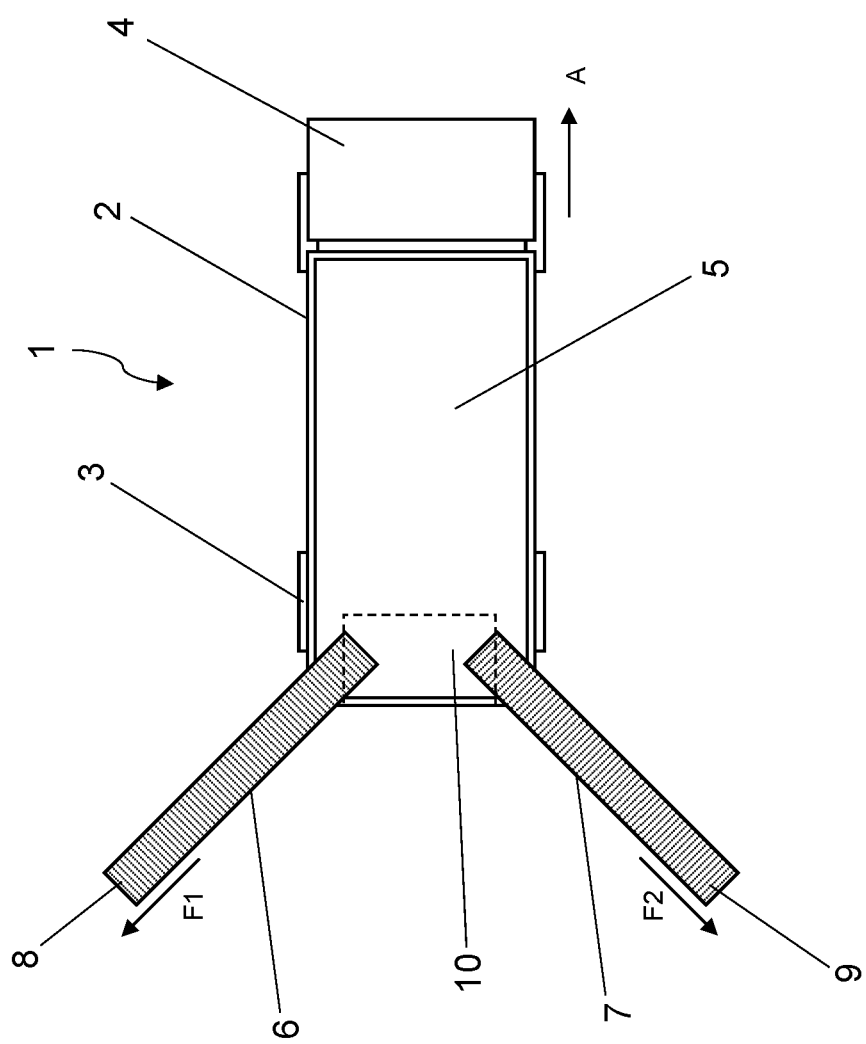
FIG. 2 is a top view of an intermediate storage vehicle according to the present invention in a second embodiment.

In the exemplary embodiment according to FIG. 2, the first material delivery conveyor device 6 and the second material delivery conveyor device 7 are shown in an alternative arrangement on the intermediate storage vehicle 1. Both material delivery conveyor devices 6, 7 are arranged in the rear area of the intermediate storage vehicle 1 and, with respect to the conveying direction of the two material delivery conveyor devices F1 and F2, protrude in a direction opposite the forward direction A beyond the intermediate storage tank 5 to the rear and to opposite sides (specifically to the right and to the left). The two material delivery conveyor devices 6 and 7 are supplied with bulk material by a common material feeding device in this exemplary embodiment as well. Reference is made to the above statements with respect to the further functionality of the intermediate storage vehicle 1 shown in FIG. 2.

Figure 3A:
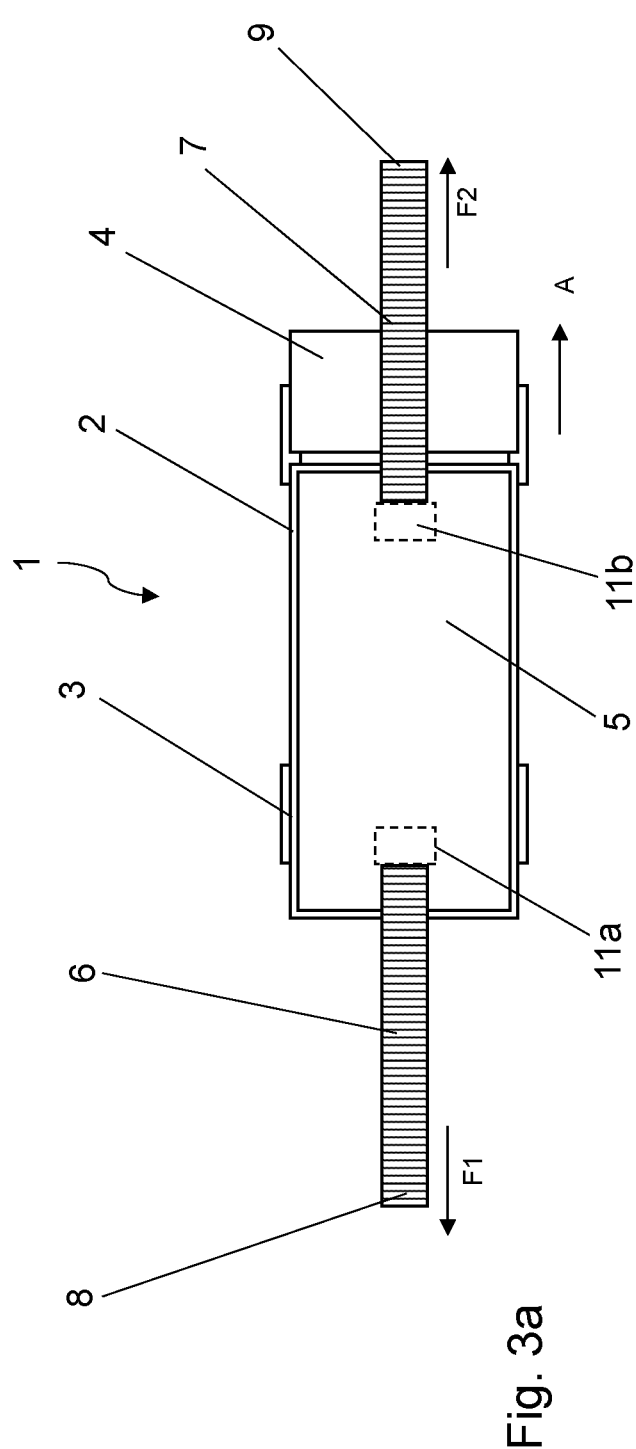
FIGS. 3a and 3b are top and side views of an intermediate storage vehicle according to the present invention in a third embodiment.
Figure 3B:
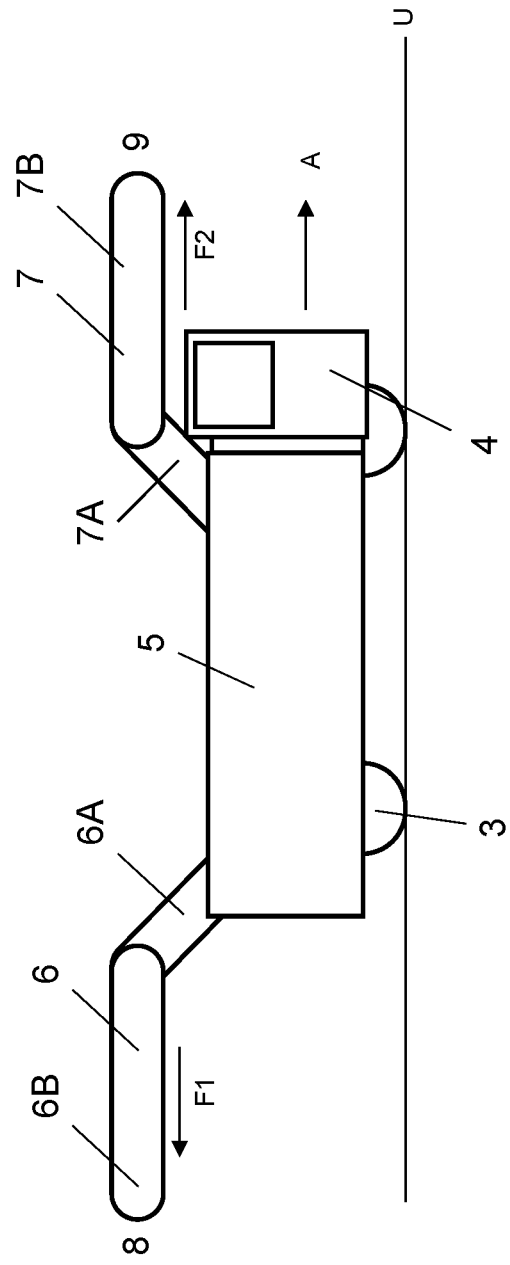

FIGS. 3A and 3B illustrate another alternative embodiment of the intermediate storage vehicle 1 according to the present invention. In contrast to the previous exemplary embodiments, the first material delivery conveyor device 6 and the second material delivery conveyor device 7 are arranged in and opposite to the forward direction A in the front and rear areas of the intermediate storage vehicle 1. Thus, loading of milled material located in the intermediate storage tank 5 is optionally or alternately possible in and opposite to the forward direction A. Another difference consists in that each material delivery conveyor device 6, 7 has its own individual material feeding device 11A/11B. Both individual material feeding devices 11A/11B are preferably controlled via a control unit (not shown in the figures).

As can be taken from the side view according to FIG. 3B, the first and second material delivery conveyor devices 6, 7 are designed with an ascending branch 6A/7 and an essentially horizontally extending branch 6B/7B adjoining thereto in the conveying direction in order to overcome both the wall height of the intermediate storage tank 5 and, particularly with respect to the second material delivery conveyor device 7 extending to the front in the forward direction A, the operator platform 4, which is designed as a cab.

In the exemplary embodiment according to FIG. 4, a first material delivery conveyor device 6 and a second material delivery conveyor device 7 are likewise provided, which are preferably designed structurally identical particularly in this embodiment (although a structurally identical design is also possible and included for the other exemplary embodiments). A first important aspect here is the depicted possible arrangement of the two material delivery conveyor devices 6 and 7 on opposite sides of, i.e., perpendicularly to, the forward direction A of the intermediate storage vehicle 1. The feature of the exemplary embodiment according to FIG. 4 now lies in the fact that the intermediate storage vehicle has several bearing points 13 on the machine frame 2, onto which the first material delivery conveyor device 6 and the second material delivery conveyor device 7 can respectively be mounted, wherein respectively only one material delivery conveyor device at a time can be positioned per bearing point 13. In this specific exemplary embodiment, the user of the intermediate storage vehicle 1 can thus choose between all four sides in the horizontal plane of the intermediate storage vehicle 1 as potential transfer points or attachment points for the first material delivery conveyor device 6 and the second material delivery conveyor device 7. This enables a maximum degree of customization and therefore an optimal configuration of first material delivery conveyor device 6 and the second material delivery conveyor device 7 for the respective on-site operational conditions.

Furthermore, in this specific exemplary embodiment, the first material delivery conveyor 6 device and the second material delivery conveyor device 7 are designed in such a way that they directly pick up and convey bulk material from the intermediate storage tank 5, i.e., without the necessity of a separate material feeding device. To this end, the material delivery conveyor devices can be designed, for example, as bucket or screw conveyors. Naturally, it is also conceivable for the present exemplary embodiment that respective material feeding devices as already shown particularly for the previous exemplary embodiments may be provided in this case as well. In view of the modular conversion concept of this exemplary embodiment, however, it is then favorable to design the respective material feeding device together the respective material delivery conveyor device either as a complete module or to provide a material feeding device designed in such a way that all potential bearing points 13 having a respective material delivery conveyor device 6, 7 arranged thereon can be supplied with bulk material from the intermediate storage tank 5 for the transfer process.

Furthermore, adaptations of the control unit are possible and included by the present invention in embodiments of this exemplary embodiment. Thus, control of the first material delivery conveyor device 6 and the second material delivery conveyor device 7 is considerably simplified if bearing points 13 are connected to a control unit (not shown in the figures) in such a manner that the respective bearing point with the respective material delivery conveyor device is automatically identified. This can substantially simplify the adaptation process after a conversion process.

In the previously shown embodiments, the first material delivery conveyor device 6 and the second material delivery conveyor device 7 were mounted essentially rigidly, which includes height adjustments, for example, through respective swivel joints, etc. The special feature of the exemplary embodiment specified in FIG. 5 now lies in the fact that the second material delivery conveyor device 7 is designed to be able to swivel about a vertical axis. In this manner, the relative position of the delivery end 9 to the intermediate storage vehicle 1 can be adjusted. The swiveling range vary here. In the present exemplary embodiment, it is possible in this way to swivel the second material delivery conveyor device 7 from a position parallel to the first material delivery conveyor device 6 to a position perpendicular thereto (when viewed in the horizontal plane), such that the conveyor devices F1 and F2 or F2' run perpendicularly to each other in the horizontal plane. The present invention further also includes the swivel movement of the second material delivery conveyor device 7 being controlled by the control unit (not shown in FIG. 6), particularly as a part of an automation system, for example, a loading assistance system. Inaccuracies in the positioning of a transport vehicle relative to the intermediate storage vehicle 1 can then be compensated through respective swivel adjustments of the second material delivery conveyor device 7. It is naturally also possible that both material delivery conveyor devices 6, 7 are designed to be able to swivel.

The intermediate storage vehicle 1 according to FIG. 6 comprises a device with a first material delivery conveyor device 6 and a second material delivery conveyor device 7, which can be fed with milled material from the intermediate storage tank 5 via a collective central material feeding device 10. The second material delivery conveyor device 7 is arranged in series to the first material delivery conveyor device 6 and is therefore fed from the intermediate storage tank 5 via a central material feeding device 10 and the first section of the first material delivery conveyor device 6 with bulk material from the intermediate storage tank. A material switch 14, which can divert bulk material located on the first material delivery conveyor device 6 to the second material delivery conveyor device 7, is the element for controlling the material flow to the delivery end 8 of the first material delivery conveyor device 6 or to the delivery end 9 of the second material delivery conveyor device 7. The position of the material switch 14 is likewise expediently controlled via the control unit. In this manner, access to or unloading of the intermediate storage tank 5 can be simplified because only one such unit is necessary in this case. At the same time, one aspect of the present invention can still be achieved by providing the two delivery ends 8, 9 of the two material delivery conveyor devices 6, 7. Thus, it is also particularly possible to design the second material delivery conveyor device 7, particularly as a connected module with the material switch 14, as an attachment element, which is attached to the intermediate storage vehicle 1 depending on the respective need.

In addition, FIG. 6 also shows the control unit 12 already described in regard to the above exemplary embodiments, with which control unit the two material delivery conveyors 6, 7, the material switch 14, and/or the central material feeding device 10 can be controlled (indicated by the dashed lines). With this, for example, the conveyor speed and/or the drop height can be respectively set separately for each material delivery conveyor device 6, 7. Such settings can be made via an input device 15 in the operator platform 4 of the intermediate storage vehicle 1 or via the input device 15 arranged on the rear end by the machine operator. Such an input device may be, for example, a control panel with switches and/or levers or even a touch screen.

FIG. 7 first illustrates the basic design of a generic ground milling machine 21, in this case a road cold milling machine. The machine shown in this case is a center rotor type large milling machine. Elements of the ground milling machine 21 are a machine part 22 and a milling unit 23. The machine part 22 comprises a machine frame 26 carried by travel devices 24 via lifting columns 25 and having a drive engine 27, an operator platform 28, and a milled material conveyor device 29. The lifting columns 25 enable height adjustment of the machine frame 26 in the vertical direction relative to the ground U. The drive engine 27 provides the drive energy necessary for propulsion and for driving the milling device. During operation, the ground milling machine 21 is operated by an operator from the operator platform 28. During operation, the ground milling machine 21 travels over the ground to be processed in operating direction A and mills ground material. This occurs specifically with the milling unit 23, comprising a milling drum box as well as a milling drum 31, which is arranged inside the milling drum box. The milling drum box 10 is designed to be open towards the ground U such that the milling drum 11 positioned within the milling drum box 10 can be engage the ground from the milling drum box 10. For milling operation, the milling drum 11 rotates about a horizontal rotation axis R extending transversely to the working direction a.

FIG. 8 illustrates the interaction of an intermediate storage vehicle 1 according to the principles of the present invention in a milling train 40 comprising an intermediate storage vehicle 1 according to the present invention, a ground milling machine 21, and one or more transport vehicles 41/41'. These transport vehicles, for example, are common and well-known transport trucks for bulk material. In this specific exemplary embodiment, the intermediate storage vehicle 1 travels in operating direction A in front of the milling machine 21. As the ground milling machine 21 removes ground material at the desired milling depth FT and conveys the milled material into the intermediate storage tank 5 of the intermediate storage vehicle 1 via the conveyor device 29, the milled material accumulates in the intermediate storage tank 5. During the milling process, i.e., while the intermediate storage vehicle 1 and the ground milling machine 21 are moving along in a largely coordinated manner in the operating direction A, the intermediate storage vehicle 1 can be approached intermittently by one or more transport vehicles 41/41' at different transfer points (in front of and to the right next to the intermediate storage vehicle 1 in this specific exemplary embodiment) and loaded with milled material from the intermediate storage tank 5 via the first material delivery conveyor device 6 or the second material delivery conveyor device 7. New storage capacities for milled material are thus created in the intermediate storage tank 5. In this connection, FIG. 8 illustrates that the intermediate storage vehicle 1 can alternately be approached, for example, by two transport vehicles 41/41' at the two material delivery conveyor devices 6, 7. Although the process of transferring the milled material from the intermediate storage vehicle 1 does not therefore proceed without interruption, but rather in intervals, the ground milling machine 21 can continue its milling operation without being affected by this. The intermediate storage vehicle 1 thus presents a type of material interface within the milling train 40, through which a largely consistent milled material supply is converted to an intermittent milled material removal. The work process of the ground milling machine 21 of the milling train 40 can therefore be designed considerably more efficiently and continuously. Thus, while the milled material is transferred in arrow direction i (transfer of milled material from the ground milling machine 21 to the intermediate storage tank 5 of the intermediate storage vehicle) relatively continuously, the transfer from the intermediate storage vehicle 1 to the transport vehicles 41/41' does not occur continuously, but rather discontinuously due to the change of transport vehicles 40/40'.

Furthermore, FIG. 8 illustrates that intermediate storage vehicle 1 may additionally be designed with assistance systems, which simplify or even automate communication with the ground milling machine 21 and/or the transport vehicles 41/41'. Specifically, for example, a distance control 16 is present on the intermediate storage vehicle 1, which monitors the distance of the intermediate storage vehicle 1 from the ground milling machine 21 driving behind and, for example, emits respective warning functions to the driver of the ground milling machine 21 and/or the intermediate storage vehicle 1 upon imminent collision or reaching/exceeding a maximum distance. The distance sensor device may also be part of an automated distance control between the intermediate storage vehicle 1 and the ground milling machine 21. The control unit 12 may further be connected to a loading management system 17, through which, for example, the start-up and/or positioning of the first material delivery conveyor device 6 and/or the second material delivery conveyor device 7 can be controlled. Further assistance systems are also conceivable, which may be integrated into the intermediate storage vehicle 1 as well. These may be, for example, systems for detecting the quantity of bulk material or milled material coming from the ground milling machine, the amount transferred to the respective transport vehicle, etc.

Finally, FIG. 9 depicts steps of a method according to one embodiment of the present invention for milling a road surface. The method shown in FIG. 9 is particularly intended to be carried out by means of a milling train according to FIG. 8, particularly using an intermediate storage vehicle according to the present invention. Steps of the method according to the present invention are milling the surface at a milling depth with a ground milling machine (step 51), gathering and loading the milled material by means of the ground milling machine into an intermediate storage vehicle having an intermediate storage tank (step 52), which step preferably takes place continuously during the milling process, and transferring the milled material located in the intermediate storage tank via a first material delivery conveyor device and/or a second material delivery conveyor device to a first and/or second transport vehicle (step 53), which step occurs in intervals, i.e., discontinuously. The method according to one embodiment of the present invention thus enables the milling process to be continued consistently and irrespective of the amount of milled material while at the same time enabling efficient removal of the milled material via transport vehicles. The intermediate storage vehicle therefore constitutes a type of mobile buffer for milled material, the properties of which consist in its capability to temporarily store milled material and also load it, if possible, to respective transport vehicles.

While the present invention has been illustrated by description of various embodiments and while those embodiments have been described in considerable detail, it is not the intention of Applicants to restrict or in any way limit the scope of the appended claims to such details. Additional advantages and modifications will readily appear to those skilled in the art. The present invention in its broader aspects is therefore not limited to the specific details and illustrative examples shown and described. Accordingly, departures may be made from such details without departing from the spirit or scope of Applicants' invention.

What is claimed is:

1. A milling train, comprising:
   a road milling machine having a milling device and a milled material loading device;
   an intermediate storage vehicle having different sides, comprising:
   an intermediate storage tank for receiving milled material;
   a first material delivery conveyor device for delivering, unloading or transferring the milled material, the first material delivery conveyor device including a material delivery point via which the milled material can be thrown off; and
   a second material delivery conveyor device for delivering, unloading or transferring the bulk material is provided which includes a material delivery point via which the milled material can be thrown off,
   the first and second material delivery conveyor devices allowing for delivery, unloading or transfer on two different sides of the intermediate storage vehicle, and
   one or more transport vehicles,
   wherein the milled material loading device of the road milling machine is designed to load milled material into the intermediate storage tank of the intermediate storage vehicle and the first and the second material delivery conveyor devices are designed to transfer the milled material onto the one or more transport vehicles in a way that enables a work process of the road milling machine to be continuous by compensating for replacement times of said one or more transport vehicles.

2. The milling train according to claim 1,
   wherein a control unit is provided which controls operation of the first and second material delivery conveyor devices.

3. The milling train according to claim 2,
   wherein the control unit is designed to independently control or regulate a conveying speed of the first material delivery conveyor device and a conveying speed of the second material delivery conveyor device.

4. The milling train according to claim 1,
   wherein the first material delivery conveyor device is arranged on the intermediate storage vehicle in such a way that it enables delivery, unloading or transfer of the bulk material in a forward direction of the intermediate storage vehicle to the front, rear, right or left, and that the second material delivery conveyor device is arranged on the intermediate storage vehicle in such a way that it enables delivery, unloading or transfer of the bulk material in the forward direction of the intermediate storage vehicle to the front, rear, right or left, and further wherein the sides of the first and second material delivery conveyor devices on which the bulk material is delivered, unloaded, or transferred, are different from each other.

5. The milling train according to claim 1,
   wherein the first material delivery conveyor device and the second material delivery conveyor device are essentially structurally identical.

6. The milling train according to claim 1,
   wherein the first material delivery conveyor device and the second material delivery conveyor device are respectively designed as belt conveyors.

7. The milling train according to claim 1,
   wherein the first and second material delivery conveyor devices are designed for unloading the same intermediate storage tank.

8. The milling train according to claim 1,
   wherein the first material delivery conveyor device and/or the second material delivery conveyor device are mounted such that the first material delivery conveyor device and/or the second material delivery conveyor device is rotatable about an axis.

9. The milling train according to claim 1,
   wherein the respective material delivery points of the first material delivery conveyor device and/or the second material delivery conveyor device are designed to be height adjustable.

10. The milling train according to claim 1,
    wherein the first and second material delivery conveyor devices are detachable from the intermediate storage vehicle, and the intermediate storage vehicle comprises at least three bearing points arranged on different sides of the intermediate storage vehicle for the first and second material delivery conveyor devices.

11. The milling train according to claim 1,
    wherein a material switch is provided through which the bulk material can be fed to the first and/or the second material delivery conveyor device.

12. The milling train according to claim 11,
    wherein a central material feeding device is provided which is controlled via the material switch and can feed the bulk material from the intermediate storage tank to the first and second material delivery conveyor devices.

13. The milling train according to claim 1,
    wherein the first material delivery conveyor device and the second material delivery conveyor device are independently operated.

14. A method for milling a road surface using a milling train comprising a milling train according to claim 1, comprising the steps of:
    a) milling a surface at a milling depth with the road milling machine;
    b) gathering and loading the milled material via the road milling machine into the intermediate storage vehicle having an intermediate storage tank; and
    c) independently of step b), transferring the milled material located in the intermediate storage device via the first material delivery conveyor device and/or the second material delivery conveyor device to a first and/or a second transport vehicle.

* * * * *